United States Patent
Englert et al.

(10) Patent No.: US 7,851,057 B2
(45) Date of Patent: Dec. 14, 2010

(54) ACOUSTICAL PANEL COMPRISING INTERLOCKING MATRIX OF SET GYPSUM AND METHOD FOR MAKING SAME

(75) Inventors: Mark H. Englert, Libertyville, IL (US); Richard B. Stevens, Crystal Lake, IL (US); Steven W. Sucech, Lake Villa, IL (US); Therese A. Fults, Woodale, IL (US); Michael J. Porter, Hanover Park, IL (US); Bruce L. Petersen, Lisle, IL (US); Russell A. Dombeck, Salem, WI (US)

(73) Assignee: United States Gypsum Company, Chicago, IL (US)

( * ) Notice: Subject to any disclaimer, the term of this patent is extended or adjusted under 35 U.S.C. 154(b) by 145 days.

(21) Appl. No.: 12/049,976

(22) Filed: Mar. 17, 2008

(65) Prior Publication Data

US 2008/0156581 A1    Jul. 3, 2008

Related U.S. Application Data

(62) Division of application No. 10/804,359, filed on Mar. 19, 2004, now Pat. No. 7,364,015.

(60) Provisional application No. 60/455,782, filed on Mar. 19, 2003.

(51) Int. Cl.
B32B 27/12    (2006.01)
(52) U.S. Cl. ..................... 428/297.4; 442/20
(58) Field of Classification Search .............. 442/20, 442/43, 45, 46, 49, 54, 180; 428/297.4
See application file for complete search history.

(56) References Cited

U.S. PATENT DOCUMENTS

| | | |
|---|---|---|
| 2,253,059 A | 8/1941 | Camp |
| 3,359,146 A | 12/1967 | Lane et al. |
| 3,444,956 A | 5/1969 | Gaffney |
| 3,542,640 A | 11/1970 | Friedberg et al. |
| 3,819,388 A | 6/1974 | Cornwell |
| 3,871,952 A | 3/1975 | Robertson |
| 3,908,062 A | 9/1975 | Roberts |
| 3,989,534 A | 11/1976 | Plunguian et al. |
| 4,031,285 A | 6/1977 | Miller et al. |
| 4,042,745 A | 8/1977 | Cornwell et al. |
| 4,047,962 A | 9/1977 | Copeland |
| 4,077,809 A | 3/1978 | Plunguian et al. |
| 4,265,964 A | 5/1981 | Burkhart |
| 4,288,263 A | 9/1981 | Delcoigne et al. |
| 4,327,146 A | 4/1982 | White |
| 4,330,589 A | 5/1982 | Saito et al. |
| 4,455,271 A | 6/1984 | Johnson |
| 4,488,932 A | 12/1984 | Eber et al. |
| 4,518,652 A | 5/1985 | Willoughby |
| 4,551,384 A | 11/1985 | Aston et al. |
| 4,613,627 A | 9/1986 | Sherman et al. |
| 4,630,419 A | 12/1986 | Pilgrim |
| 4,636,444 A | 1/1987 | Lombardozzi |
| 4,702,870 A | 10/1987 | Setterholm et al. |
| 4,804,688 A | 2/1989 | Vassileff |
| 4,899,498 A | 2/1990 | Grieb |
| 5,085,929 A | 2/1992 | Bruce et al. |
| 5,109,030 A | 4/1992 | Chao et al. |
| 5,116,671 A | 5/1992 | Bruce et al. |
| 5,148,645 A | 9/1992 | Lehnert et al. |
| 5,158,612 A | 10/1992 | Savoly et al. |
| 5,202,174 A | 4/1993 | Capaul |
| 5,250,578 A | 10/1993 | Cornwell |
| 5,277,762 A | 1/1994 | Felegi, Jr. et al. |
| 5,395,438 A | 3/1995 | Baig et al. |
| 5,496,441 A | 3/1996 | Tran |
| 5,558,710 A | 9/1996 | Baig |
| 5,612,385 A | 3/1997 | Ceaser et al. |
| 5,631,097 A | 5/1997 | Andersen et al. |
| 5,641,584 A | 6/1997 | Andersen et al. |
| 5,683,635 A | 11/1997 | Sucech et al. |
| 5,696,174 A | 12/1997 | Chao et al. |
| 5,720,851 A | 2/1998 | Reiner |
| 5,817,262 A | 10/1998 | Englert |
| 5,824,148 A | 10/1998 | Cornwell |
| 5,922,447 A | 7/1999 | Baig |
| 5,948,157 A | 9/1999 | McKenney et al. |
| 5,980,628 A | 11/1999 | Hjelmeland et al. |
| 6,010,596 A | 1/2000 | Song |
| 6,152,394 A | 11/2000 | Sakata et al. |
| 6,342,284 B1 | 1/2002 | Yu et al. |

(Continued)

FOREIGN PATENT DOCUMENTS

CL    30030    2/1976

(Continued)

OTHER PUBLICATIONS

U.S. Appl. No. 08/916,058, filed Aug. 21, 1997, Yu et al.

*Primary Examiner*—Arti Singh-Pandey
(74) *Attorney, Agent, or Firm*—Leydig, Voit & Mayer, Ltd.; Philip T. Petti; David F. Janci

(57) ABSTRACT

An acoustical panel comprising a continuous phase of an interlocking set gypsum matrix and a method of preparing an acoustical panel are disclosed.

45 Claims, No Drawings

U.S. PATENT DOCUMENTS

| | | |
|---|---|---|
| 6,387,172 B1 | 5/2002 | Yu et al. |
| 6,401,414 B1 | 6/2002 | Steel et al. |
| 6,409,824 B1 | 6/2002 | Veeramasuneni et al. |
| 6,443,258 B1 | 9/2002 | Putt et al. |
| 6,481,171 B2 | 11/2002 | Yu et al. |
| 6,488,761 B1 | 12/2002 | Symons |
| 6,494,609 B1 | 12/2002 | Wittbold et al. |
| 6,613,424 B1 | 9/2003 | Putt et al. |
| 6,620,487 B1 | 9/2003 | Tonyan et al. |
| 6,632,550 B1 | 10/2003 | Yu et al. |
| 6,780,356 B1 | 8/2004 | Putt et al. |
| 6,783,587 B2 | 8/2004 | Sethuraman et al. |
| 6,815,049 B2 | 11/2004 | Veeramasuneni et al. |
| 2002/0045074 A1 | 4/2002 | Yu et al. |
| 2002/0112651 A1 | 8/2002 | Yu et al. |
| 2002/0139611 A1 | 10/2002 | Baig |
| 2003/0060113 A1 | 3/2003 | Christie et al. |
| 2003/0134556 A1 | 7/2003 | Christie et al. |
| 2003/0178250 A1 | 9/2003 | Putt et al. |
| 2004/0026002 A1 | 2/2004 | Weldon et al. |
| 2004/0152379 A1 | 8/2004 | McLarty et al. |
| 2004/0241271 A1 | 12/2004 | Derusco et al. |
| 2006/0162839 A1 | 7/2006 | Seki et al. |

FOREIGN PATENT DOCUMENTS

| | | |
|---|---|---|
| CL | 1193-95 | 4/1996 |
| CL | 2746-97 | 9/1998 |
| CL | 2747-97 | 9/1998 |
| CL | 1895-98 | 3/1999 |
| CL | 318-99 | 7/1999 |
| CL | 2235-01 | 6/2002 |
| CL | 2674-01 | 7/2002 |
| CL | 2675-01 | 7/2002 |
| CL | 2815-01 | 9/2002 |
| CL | 977-02 | 2/2003 |
| CL | 2158-02 | 9/2003 |
| CL | 2645-02 | 10/2003 |
| EP | 1 088 632 A2 | 4/2001 |
| EP | 1 088 800 A2 | 4/2001 |
| EP | 1 158 095 A2 | 11/2001 |
| EP | 1 205 722 A1 | 5/2002 |
| FR | 2 814 459 A1 | 3/2002 |
| FR | 2 824 552 A1 | 11/2002 |
| GB | 1 118 621 | 7/1968 |
| JP | 53 146724 A | 12/1978 |
| JP | 359030871 A | 2/1984 |
| JP | 59-073904 A | 4/1984 |
| JP | 363295485 A | 12/1988 |
| JP | 2001-272985 A | 10/2001 |
| JP | 2001-278677 A | 10/2001 |
| JP | 2003-140661 A | 5/2003 |
| KZ | 12387 A | 12/2002 |
| RU | 2 143 408 C1 | 12/1999 |
| RU | 2 263 644 C2 | 11/2005 |
| RU | 2 360 883 C2 | 7/2009 |
| SU | 1016263 A1 | 5/1983 |
| SU | 1 124 004 A | 11/1984 |
| SU | 1789518 A1 | 1/1993 |
| WO | WO 96/12606 A1 | 5/1996 |
| WO | WO 96/38394 A1 | 12/1996 |
| WO | 99/08978 A1 | 2/1999 |
| WO | WO 01/81264 A1 | 11/2001 |
| WO | WO 02/12141 A1 | 2/2002 |
| WO | WO 02/20423 A2 | 3/2002 |
| WO | WO 02/38348 A1 | 5/2002 |
| WO | WO 02/098646 A1 | 12/2002 |
| WO | WO 03/053878 A1 | 7/2003 |
| WO | WO 2004083146 A2 | 9/2004 |

US 7,851,057 B2

ACOUSTICAL PANEL COMPRISING INTERLOCKING MATRIX OF SET GYPSUM AND METHOD FOR MAKING SAME

CROSS-REFERENCE TO RELATED APPLICATION

This application is a divisional of co-pending U.S. patent application Ser. No. 10/804,359, filed Mar. 19, 2004, which claims the benefit of U.S. Provisional Application No. 60/455,782, filed Mar. 19, 2003, both of which are hereby incorporated by reference in their entirety.

TECHNICAL FIELD OF THE INVENTION

The present invention relates generally to acoustical panels. More particularly, the invention relates to acoustical panels comprising an interlocking matrix of set gypsum and to methods for the preparation thereof.

BACKGROUND OF THE INVENTION

Acoustical panels are used to form interior surfaces, such as ceiling tiles, wall panels, and other partitions (e.g., partitions between office cubicles), in commercial or residential buildings. The panels are generally planar in shape and include an acoustical layer containing a combination of materials selected to provide suitable acoustic absorbency while retaining sufficient durability. For example, common materials presently used in forming acoustical panels include mineral wool, fiberglass, expanded perlite, clay, calcium sulfate hemihydrate, calcium sulfate dihydrate particles, calcium carbonate, paper fiber, and binder such as starch or latex. Mineral wool is most commonly used because it helps create a porous fibrous structure and thus provides good sound absorption.

Many acoustical panels are prepared in a manner similar to conventional papermaking processes by water-felting dilute aqueous dispersions of mineral wool, perlite, binder, and other ingredients as desired. In such processes, the dispersion flows onto a moving foraminous support wire, such as that of a Fourdrinier or Oliver mat-forming machine for dewatering, as will be appreciated by one of ordinary skill in the art. The dispersion dewaters first by gravity drainage and then by vacuum suction. The wet mat is dried in a heated convection oven, and the dried material is cut to desired dimensions and optionally top-coated with paint to obtain the finished panel. An example of a panel prepared in this manner is the AURATONE® ceiling tile, commercially available from USG Interiors, Inc.

Acoustical panels also can be made by a wet pulp molding or cast process such as described in U.S. Pat. No. 1,769,519. In accordance with this process, a molding composition comprising granulated mineral wool fibers, fillers, colorants, a binder such as cooked starch, and water, is prepared for molding or casting the panel. The composition is placed upon suitable trays that have been covered with paper or a paper-backed metallic foil and then the composition is screeded to a desired thickness with a forming plate. A decorative surface, such as elongated fissures, also may be provided by a screed bar or patterned roll. The trays filled with the mineral wool composition are then placed in an oven to dry. An example of a panel prepared in this manner is the ACOUSTONE® ceiling tile, commercially available from USG Interiors, Inc.

The water felting and tray casting techniques for preparing acoustical panels are not entirely satisfactory because of their complexity and rather significant expense. In addition to raw material costs, these processes expend large amounts of water and energy. Furthermore, many panels prepared according to these methods are subject to unsightly permanent deformation such as sag, especially under conditions of high humidity. In this respect, because many panels are composed of hygroscopic binder such as recycled paper fiber and/or starch, such panels are susceptible to sagging. The possibility of sagging is particularly problematic in the event that the panels are stored and/or employed horizontally. The panels may sag, for example, in areas between the points at which they are fastened to, or supported by, an underlying structure, including, for example, a ceiling grid. The problem of sagging can be more pronounced where the panels must carry loads, including, for example, insulation.

Some acoustical panels are designed to have set gypsum (i.e., calcium sulfate dihydrate) in the acoustical layer. Because set gypsum is not inherently a particularly acoustically absorbent material, many acoustical panels comprising set gypsum include very large mechanically-formed holes that may be, for example, drilled, punched, or otherwise formed to pass through the entire depth of the panel. The holes of acoustical panels of this type typically have a diameter of at least one centimeter, such as found in acoustical panels commercially available from Danoline of Valby, Denmark and from British Gypsum. Many of these panels also utilize an acoustically functional backing sheet. The acoustically functional backing sheet is typically glass fleece or a polymeric material that absorbs or dissipates sound transmitted by the large mechanically-formed holes, but a significant amount of sound is still transmitted through the panel. Although the large mechanically-formed holes provide some acoustical absorbance where there is a plenum behind the panel, many consumers do not find them to be aesthetically pleasing. Gypsum-based acoustical panels having mechanically-formed large holes also are relatively dense products and therefore are cumbersome to transport, to handle, and to install. In addition, the backing sheet adds considerable expense to such products.

More recently, there have been efforts in the art to form acoustical panels from cementitious materials. For example, U.S. Pat. No. 6,443,258 B1 describes an acoustically absorbent porous panel formed individually in a mold from a cured aqueous foamed cementitious material that includes a very low ratio of water to cementitious material (i.e., less than 1:1). Paper fibers are avoided in the panels described in the '258 patent so as to accommodate the low water to cementitious material ratio taught therein. As a substitute for paper fiber, the '258 patent describes the use of polyester, fiberglass, or mineral wool characterized by very long fiber lengths. According to the '258 patent, the length of such fibers is preferably on the order of 0.5 inches so that the fibers can pass through the crystalline cement structure and also pass through the pores created by the foaming process. Thus, acoustical panels prepared according to the '258 patent are expensive to produce and the process for making the panels is inefficient for generating economies of scale.

Accordingly, it will be appreciated from the foregoing that there is a need in the art for acoustical panels that are relatively inexpensive to manufacture and that are produced efficiently in large quantities on a gypsum board line. It will be appreciated also that there is a need in the art for such an acoustical panel that is aesthetically pleasing and does not require the presence of relatively large holes that are mechanically bored into the panel. It will be appreciated further that there is a need in the art for such an acoustical panel that resists permanent deformation, such as sag. The invention provides an acoustical panel and method for the preparation thereof that includes such features. These and other advantages of the present invention, as well as additional inventive features, will be apparent from the description of the invention provided herein.

BRIEF SUMMARY OF THE INVENTION

The present invention provides acoustical panel comprising an acoustical layer comprising an interlocking matrix of set gypsum. In some embodiments, the panel is the acoustical layer by itself as a monolithic product. In other embodiments, the panel comprises a composite which includes the acoustical layer, a backing sheet, and optionally a support or densified layer disposed between the backing sheet and acoustical layer. In other embodiments, the panel includes a scrim layer disposed between the densified layer and the acoustical layer. Various alternative combinations of acoustical layer, support or densified layer, scrim layer, and backing sheet are also contemplated.

The present invention also provides a method for preparing acoustical panel. In one embodiment of the method of the present invention, a mixture comprising water, foaming agent, and calcined gypsum is cast to form an acoustical layer precursor as part of a continuous ribbon of preselected width and thickness. The cast acoustical layer precursor of the ribbon is maintained under conditions sufficient for the calcined gypsum to form an interlocking matrix of set gypsum, and thereby forms the acoustical layer. Typically the acoustical layer is wet at this stage of the process due to the presence of excess water in the cast ribbon from which the interlocking matrix of set gypsum is formed. The wet acoustical layer is cut to form wet acoustical panel precursor of pre-selected dimensions. Wet panel precursor is dried to form a dry acoustical panel. In some embodiments, the acoustical panels of the present invention exhibit a Normal Incident Sound Absorption of at least about 0.32, pursuant to modified ASTM E 1050-98, as described herein below.

Preferably the continuous ribbon includes a backing sheet for supporting the acoustical layer precursor during the preparation of acoustical panel. Typically, the backing sheet remains a part of the finished acoustical panel, but it need not in all embodiments of the invention. In preparing acoustical panel, the mixture for forming the acoustical layer precursor is applied directly to the backing sheet. In preferred embodiments, a mixture for forming the densified layer precursor is applied to the backing sheet prior to application of the acoustical layer precursor. In other embodiments, a scrim layer is applied between the densified layer and the acoustical layer precursor.

In some embodiments, the present invention provides a method for preparing acoustical panel comprising preparing a continuous ribbon comprising a mixture for forming the acoustical layer, the mixture including (a) water, (b) calcined gypsum, and (c) foaming agent, and optionally one or more of the following: (d) cellulosic fiber, (e) lightweight aggregate, (f) binder, (g) accelerator, (h) water reducing agent, and (i) an enhancing material selected from the group consisting of an ammonium polyphosphate having 500-3000 repeating phosphate units, a trimetaphosphate compound, a tetrametaphosphate compound, a hexametaphosphate compound, and combinations thereof. Backing sheet, densified layer, and/or scrim layer can be included as described herein. The ribbon is maintained under conditions sufficient for the calcined gypsum to form an interlocking matrix of set gypsum. The ribbon is cut to form one or more panels of pre-selected dimensions.

In some embodiments, the present invention provides acoustical panel comprising an acoustical layer comprising an interlocking matrix of set gypsum and one or more additives such as cellulosic fiber, lightweight aggregate, and/or an enhancing material selected from the group consisting of an ammonium polyphosphate having 500-3000 repeating phosphate units, a trimetaphosphate compound, a tetrametaphosphate compound, a hexametaphosphate compound, and combinations thereof. Binder, foaming agent, accelerator, and water reducing agent can also be included in the mixture used to form the acoustical layer of the acoustical panel. Preferably, the panel comprises a backing sheet for supporting the acoustical layer. Even more preferably, the panel comprises a densified layer on the backing sheet, and still more preferably, the panel includes a scrim layer between the densified layer and the acoustical layer.

The invention may best be understood with reference to the following detailed description of the preferred embodiments.

DETAILED DESCRIPTION OF THE INVENTION

The present invention provides acoustical panel which includes an acoustical layer comprising an interlocking matrix of set gypsum, and a continuous process for making acoustical panel. The acoustical panel can be the acoustical layer itself as a monolithic layer and it can be a multi-layer composite. Panels according to the invention exhibit desirable acoustical properties, flexural strength, surface hardness, and resistance to permanent deformation, such as sag, for use in a variety of different applications, including, for example, ceiling tiles, wall panels, and partitions such as between office cubicles or the like. In keeping with these and other applications, the acoustical layer of the inventive acoustical panels preferably has a density of from about 10 lb/ft$^3$ to about 25 lb/ft$^3$, more preferably, from about 12 lb/ft$^3$ to about 20 lb/ft$^3$, with a density of about 16 lb/ft$^3$ most preferred in ceiling tile applications. In some embodiments without a densified layer and/or a scrim layer as described herein, it may be desirable to provide an acoustical layer having a density at the higher end of the preferred range, or even higher.

Advantageously, the set gypsum-containing acoustical panels of the invention provide the desirable acoustical properties without requiring the presence of large, mechanically generated holes, and without the use of mineral wool. Thus, in preferred embodiments, the panels are essentially free of mineral wool and mechanically generated holes having a diameter greater than 1 cm such that the acoustical properties of the invention are achieved without the presence of either, although such mechanically generated pores and/or mineral wool can be included in some embodiments, if desired. Preferred panels according to the invention do not include voids of any kind (such as mechanically generated holes) having an average maximum diameter greater than about 2 mm.

In accordance with the present invention, acoustical panel can be prepared on a gypsum wallboard manufacturing line. A conventional gypsum wallboard manufacturing line can be used to make acoustical panel of the present invention, modified as desired to accommodate the strength and cure characteristics of the slurry used to make acoustical panel. In manufacture, ribbon comprising an acoustical panel precursor is prepared. In some embodiments, ribbon also includes a backing sheet, densified layer precursor and/or scrim layer. The acoustical layer precursor and densified layer precursor (if present) used to form set gypsum-containing acoustical panel according to the invention are prepared by forming a mixture of water, calcined gypsum and other additives. Various components, such as, for example, cellulosic fiber, lightweight aggregate, binder, foaming agent, foam stabilizer, accelerator, water reducing agent, and/or enhancing material for improving resistance to permanent deformation, e.g., due to high humidity conditions, can be added to the aqueous calcined gypsum slurry as desired. The mixture for forming the densified layer precursor can be the same or different in composition as the mixture for forming the acoustical layer precursor.

In the continuous process for making acoustical panel, the mixture used for forming acoustical layer is cast as an acoustical layer precursor in the form of at least part of a continuous ribbon. The conveyor carries the ribbon on a conveyor, such as a belt, and/or rollers, or the like to a knife where the ribbon is cut into wet panel precursor of preselected dimensions. The acoustical layer precursor and densified layer precursor (if present) are cured or hardened so as to form an interlocking matrix of set gypsum and hence are transformed into the acoustical layer and densified layer (if present) as the ribbon travels to the knife. The present invention contemplates the use of conveyors, rollers, and combinations thereof, so long as the integrity of the cast ribbon is maintained during the hardening or curing process leading to the formation of the interlocking matrix of set gypsum. In preferred embodiments, as acoustical layer forms, no outer high density boundary layer forms contrary to the situation described with respect to the panels of U.S. Pat. No. 6,443,258 B1. Such preferred embodiments of the invention are advantageous because the panel is prepared according to the process with no need to remove, such as by grinding, any non-acoustical high density boundary layer.

The backing sheet can be provided to support the panel as is known in wallboard manufacture. The backing sheet desirably acts to transfer stresses so that they are averaged out across the length of the ribbon or panel. The mixture for forming acoustical layer precursor can be applied directly or indirectly onto the backing sheet. In preferred embodiments, the mixture for forming the densified layer precursor is applied to the backing sheet to enhance strength. In even more preferred embodiments, to further enhance wet and dry strength of the acoustical panel precursor and of the acoustical panel, a scrim layer is included. The scrim layer is applied, during formation of the panel, onto the surface of the densified layer precursor opposite the backing sheet. The acoustical layer precursor then is applied to the scrim layer.

As will be appreciated by one of ordinary skill in the art, the aqueous gypsum mixture (e.g., slurry) for forming the acoustical layer precursor and densified layer precursor (if present), respectively, can be formed in a conventional mixing apparatus used in making gypsum wallboard. After mixing, the aqueous gypsum mixture used to form the densified layer precursor, if present, is discharged from the mixer from one or more outlets separate from the outlet for the aqueous gypsum mixture used to form the acoustical layer precursor. The substrate onto which the gypsum mixture is cast will depend on the type of panel being made. For example, the mixture for forming the acoustical layer precursor can be cast onto (a) the backing sheet; (b) the scrim layer, if present; or (c) the densified layer precursor, if present and the scrim layer is not present.

The backing sheet is rolled onto a moving surface (such as a conveyor or the like) to cast a continuous ribbon of desired shape comprising the acoustical layer precursor, the backing sheet, and optionally, one or both of the densified layer precursor and scrim layer. If desired, a forming plate or roller can be applied to the outer surface of the acoustical layer precursor to achieve a desired thickness. It also will be appreciated that a facing sheet can be applied to the acoustical layer precursor. When a facing sheet is employed, the forming plate or roller is applied to the facing sheet to arrive at the selected thickness.

The acoustical layer is formed after the acoustical layer precursor cures, i.e., after the interlocking matrix of set gypsum is formed. Desirably, the acoustical layer has a thickness of from about 0.3 inches to about 0.75 inch, preferably about 0.375 inch, about 0.5 inch, about 0.625 inch, about 0.750 inch, about 1 inch, or thicker). Where the densified layer and/or scrim layer are included in the acoustical panel, lower thickness for the acoustical layer can be selected from these preferred ranges, as will be appreciated by one of ordinary skill in the art. Acoustical panel of the invention preferably has an overall thickness of from about 0.5 inch to about 1 inch, more preferably from about 0.5 to about 0.625 inch.

The use of a forming plate or forming rollers is well known in the production of gypsum wallboard. In some embodiments of the present invention, for example, where no facing sheet is present, it may be desirable for the forming plate or rollers to be in the form of a vibrating plate or a fluidization membrane. The vibrating plate is vibrated horizontally so as to create shear, thereby preventing the gypsum slurry from adhering to the vibrating plate, and thus allowing for a smooth uniform caliper.

The fluidization membrane permits water to be injected through pores in the membrane at a very low flow rate, thereby forming a slick surface between the forming fluidization membrane and the gypsum slurry, so as to inhibit the adherence of gypsum slurry onto the forming fluidization membrane and allowing for a smooth uniform caliper. By way of example, the fluidization membrane can be in the form of Dynapore Models LFM-1 or LFM-10, commercially available from Martin Kurz & Co., Inc. of Mineola, N.Y.

In preferred embodiments, a fluidization device comprises a fluidization membrane, which is disposed so that a face surface of the fluidization device contacts the gypsum slurry to control ribbon thickness. The fluidization device also includes at least one sidewall (e.g., four sidewalls) extending upwardly and away from the gypsum slurry. Means for providing water from a water source, e.g., a hose, tube, or the like, onto a back surface of the membrane is also provided. The water then seeps through the pores from the back surface of the fluidization device, to the face surface of the fluidization device, and onto the gypsum slurry. In some embodiments, the fluidization device also includes a top wall connecting the sidewalls and disposed parallel to the fluidization membrane so as to form a box, so long as an opening is created in the top wall or sidewalls to allow for the means for providing water.

If desired, a pattern can be permanently impressed onto the continuous ribbon, using conventional techniques, to provide a desired texture in acoustical panel for aesthetic purposes. For example, a continuous belt means can be used to impress a pattern as the gypsum sets, as is known in the art. The pattern can be impressed in the acoustical layer precursor. As will be appreciated by one of ordinary skill in the art, the pattern preferably is impressed at a point in the setting process at which sufficient setting has taken place so that the pattern is retained.

The continuous ribbon continues to travel from the rollers to a knife, where the ribbon is cut into wet panel precursors of a predetermined length. If desired, two or more knives, applied at different stages in the process, can be used to cut the ribbon into precursors of predetermined dimensions suitable for drying (e.g., 4 ft×9 ft), as will be appreciated by one of ordinary skill in the art. The knife can be in any suitable form, such as, for example, a conventional knife used in wallboard manufacture, a water jet knife, or the like. As the continuous ribbon travels toward the knife, it is allowed to harden to form an interlocking matrix of set gypsum, that is, a matrix of calcium sulfate dihydrate. It is the desired hydration of the calcined gypsum that enables the formation of an interlocking matrix of set gypsum crystals, thereby imparting strength to the gypsum structure in acoustical panel, as well as green strength (discussed herein below) to the continuous ribbon as it hardens and in the wet panel precursor.

The length of the continuous ribbon can vary. Because the aqueous gypsum mixture typically is allowed to harden as the continuous ribbon is transported on the surface on which it is cast (e.g., a conveyor or the like), the continuous ribbon may extend for 50 ft or longer, 100 ft or longer, 250 ft or longer, and preferably, 350 ft or longer. For example, depending upon the design of the manufacturing line, based upon the speed of the manufacturing line and rate of hydration of the gypsum slurry, the continuous ribbon can be as long as 500 ft or longer, 750 ft or longer, 1000 ft or longer, and 1250 ft or more in preferred embodiments so that at least about 98% of the set gypsum is formed prior to cutting the ribbon into wet panel precursor.

After the gypsum sets and the ribbon is cut, the wet panel precursors are transferred to a kiln to dry off unreacted water under mild heat to yield dry acoustical panel. The wet panel precursors are dried for a period of time sufficient to dry the panels, preferably at a lower temperature than temperatures used in drying conventional gypsum wallboard. In this respect, the panels preferably are dried at a temperature so as to avoid re-calcining the set gypsum, especially in embodiments where a facing sheet, which might otherwise protect the gypsum from re-calcining, is lacking. Because the acoustical layer of preferred panels according to the invention preferably has a relatively low density, e.g., from about 10 $lb/ft^3$ to about 25 $lb/ft^3$, preferred panels preferably require a drying time in the kiln of about 90 minutes or less.

In gypsum board lines where driven rollers are employed to transport the cut panel precursors to the kiln at higher rates than the movable surface on which the gypsum is cast, it may be necessary to control the motors driving the transporting rollers to reduce the rate of transport typically used with conventional gypsum wallboard in order to reduce vibration to which the cut panel precursors might otherwise be subjected. It may also be desirable in some embodiments to provide sufficient numbers of the transporting rollers so that they are spaced no more than about 6 inches apart, more preferably, no more than about 4 inches apart (or even closer), and/or to use belts instead or on top of the transporting rollers, so that there is less opportunity for the panel precursors (especially the ends) to become damaged by, or caught in, the transporting rollers, and to dampen vibrations. In some embodiments, the entire line can be belted.

In preferred embodiments, panels according to the invention comprise a backing sheet. Any suitable material for the backing sheet may be used such that the backing sheet provides support and strength for the ribbon, panel precursors, and the acoustical panel. For example, the backing sheet helps enhance resistance to vibration, thereby inhibiting fracture, as the ribbon and panel precursors are subjected to the manufacturing process. In some embodiments, the backing sheet may be in the form of a material such as paper (e.g., manila paper, kraft paper, etc.), non-woven glass face, metallic foil (e.g., aluminum), and the like. In some embodiments, a laminate containing paper and, for example, a metallic foil can be used, in which case the paper contacts the densified layer (if included) or acoustical layer and the foil serves as the outer surface of the backing.

In the event that paper is selected for the backing sheet, it may be convenient to use conventional wallboard paper so that a single type of paper may be produced and installed on a line. The same type of paper can accommodate production of both wallboard and acoustical panels according to the invention. For example, as will be appreciated by one of ordinary skill in the art, conventional wallboard paper can be in the form of, for example, 6-8 ply paper as prepared in a cylinder machine, or 1-4 ply paper as prepared in a Fourdrinier paper process. Lower ply paper (e.g., as made according to a Fourdrinier process), preferably at least 2 ply paper, is preferred because it reduces weight and enhances cutability. Where such lower ply paper is used, as will be appreciated, it may be desirable to employ powered unwinders for the paper roll to minimize tension as the paper unwinds so that the lower ply paper provides the requisite strength and support.

It is noteworthy that the panels according to the invention preferably are unbalanced such that the face side of the panel does not contain such a sheet, unlike conventional gypsum wallboard, which contains paper on both the face and back surfaces of the board. However, although less desirable, in some embodiments of the invention, acoustical panel can be provided with a sheet, such as paper, on the face side, which can be discarded prior to drying in the kiln, or alternatively, an acoustically transparent sheet can remain on the face side of the finished panel, particularly if perforations, preferably pinhole sized, are provided through the sheet. For example, the acoustically transparent sheet may be provided as a decorative surface as will be appreciated by one skilled in the art. Suitable facing sheet materials include, for example, perforated vinyl, perforated or acoustically transparent paper, non-woven scrims, woven fabric or cloth materials, and the like. In some embodiments, the backing sheet and/or facing sheet, if present, can be pre-coated with a binder such as a pregelatinized starch to enhance the bond between the backing and/or facing sheets on the one hand and the interlocking matrix of set gypsum of the acoustical layer and/or densified layer on the other hand.

Preferably, a densified layer precursor, comprising calcined gypsum and water, is applied onto the backing sheet. The densified layer is formed after the densified layer precursor is cured such that an interlocking matrix of set gypsum is formed. The densified layer can be similar in composition to the acoustical layer, except that the densified layer is much more dense, usually because less foam voids are present. The gypsum slurry stream for forming the densified layer can be taken from the same mixer used to form the acoustical layer precursor. Preferably, however, the mixture for forming the densified layer precursor will not include the same amount of foam as the mixture used to form the acoustical layer precursor. The gypsum slurry stream for forming the densified layer is applied onto the backing sheet upstream of the discharge of the acoustical layer precursor from the mixer. For purposes of the present application, when weight percent ranges for ingredients are provided, it will be understood that the specified amounts are by weight of the solids content in the gypsum slurry mixture for forming the acoustical layer precursor, and may also apply to the gypsum slurry for forming the densified layer precursor if both streams are taken from the same mixer and such additives are added in the mixer. A screed bar or the like can be used to achieve a desired thickness for the densified layer.

To achieve its relatively high density, desirably, the densified layer is prepared so as to form a minimum of foam voids. Thus, in preferred embodiments, foam is added to the gypsum slurry after it exits the mixer through a discharge outlet such as, for example, a tangential discharge conduit or bottom discharge conduit as are known in the art. See, for example, commonly assigned U.S. Pat. Nos. 5,683,635 and 6,494,609. As will be appreciated by those skilled in the art, in preferred embodiments where the foam is added in the discharge conduit, a gypsum slurry stream for forming the densified layer precursor can be tapped from the mixer from one or more outlets such that little or no foaming agent is included in the densified layer precursor. In other embodiments, where the foaming agent is added in the mixer, it is desirable to employ one or more secondary mixers (often referred to in the art as "edge mixers" since they generally are used in the formation of hard edges for wallboard) to beat foam out of the mixture used for forming the densified layer precursor so that the densified layer can be formed on the backing sheet. The precise location for the outlet(s) in the mixer for the slurry for forming the densified layer will vary depending upon the particular configuration of each manufacturing line, and can be decided upon by those of ordinary skill in the art.

Furthermore, as will be appreciated by one of ordinary skill in the art, foaming agent generally is pre-generated such that it is added to the gypsum slurry while carried in water. Thus, it will be appreciated that addition of the foaming agent into the mixer discharge is preferable for the additional reason that the densified layer will be formed with a lower water to calcined gypsum ratio than the gypsum slurry that forms the acoustical layer such that the density of the densified layer is increased because the evaporated water void volume will be less than that of the acoustical layer.

Aside from the foaming agent, to the extent that other components are included in the gypsum slurry used to form the acoustical layer, such as, for example, cellulosic fiber, lightweight aggregate, binder, foam stabilizer, accelerator, water reducing agent, and/or an enhancing material for improving resistance to permanent deformation, their presence in the gypsum slurry used to form the densified layer is acceptable. While such ingredients are not needed in the densified layer, if it is desired to include them in the gypsum slurry for forming the acoustical layer, it may be convenient to include such ingredients in the mixer such that they ultimately will be included in both the gypsum slurry stream for forming the acoustical layer precursor and the gypsum slurry stream for forming the densified layer precursor. However, in some embodiments, some or all of the ingredients may be inserted into the discharge from the mixer, similarly to the foam, so that their presence is eliminated or minimized in the densified layer.

The densified layer desirably enhances wet strength (e.g., flexural strength) to enhance handleability on the moving surface of the manufacturing line, as well as dry strength, and cutability so that acoustical panel of the invention can be installed readily without breaking under normal wear and tear during installation. Thus, if present, the densified layer desirably improves the strength of the finished panel. The densified layer can be relatively thin as compared to the acoustical layer since the densified layer is not necessary to impart acoustical value to the panel. By way of example, the densified layer can have a thickness of from about 0.05 inches to about 0.3 inches, more preferably, from about 0.125 inches to about 0.25 inches, still more preferably from about 0.175 inches to about 0.225 inches, even more preferably, about 0.2 inches. The densified layer preferably has a density of at least about 30 lbs/ft$^3$, more preferably a density from about 35 bs/ft$^3$ to about 50 lbs/ft$^3$, even more preferably, from about 38 lbs/ft$^3$ to about 46 lbs/ft$^3$, and still more preferably, from about 40 lbs/ft$^3$ to about 45 lbs/ft$^3$.

A scrim layer optionally can be included in acoustical panel. In embodiments where a densified layer is included in acoustical panel, the scrim layer preferably is disposed between the densified layer and the acoustical layer. In preparation of the panel, the scrim layer preferably is applied onto the densified layer precursor. The scrim layer preferably is included to further enhance strength and cutability, and to further support the acoustical layer precursor and the acoustical layer. Desirably, the scrim layer is selected so as to have expansion properties compatible with the backing sheet to prevent warping under varying humidity conditions, as will be appreciated by one of ordinary skill in the art. When acoustical panel includes the densified layer and the scrim layer, the panel will comprise, generally, the following structure: acoustical layer, scrim layer, densified layer, backing sheet.

The scrim layer, if included, preferably is porous to facilitate attachment of the scrim layer to the acoustical layer and the densified layer, respectively, and to enhance drying of the densified layer precursor. Where the scrim layer is not porous, drying time for the densified layer can be prolonged. Attachment of the scrim layer, in a sandwich structure, to the densified layer and acoustical layer, respectively, may also be enhanced by use of a binder, such as by applying a pregelatinized starch onto one or both surfaces of the scrim layer. Binder can be included in the mixture used to form the acoustical layer precursor and the densified layer precursor. Binder can also be sprayed onto the scrim layer and backing sheet.

By way of example, and not by way of limitation, the scrim layer can be in the form of paper commonly used in forming backing sheets, non-woven fiberglass scrims, woven fiberglass mats, other synthetic fiber mats such as polyester, and the like, and combinations thereof. Preferred types of paper include paper used on the back side of wallboard as well as paper conventionally used on plaster-based board, as will be appreciated by one of ordinary skill in the art. Paper such as IMPERIAL® gypsum base face paper used with IMPERIAL® plaster, commercially available from USG, can be used. Desirably, the exterior plys of paper used for the scrim layer are not treated with a waterproofing agent.

The scrim layer, if included, is provided to enhance the tensile and/or flexural strength of the panel. For example, in some embodiments, the scrim layer is provided in a thickness of from about 0.003 inches to about 0.02 inches (e.g., 0.013 inch).

The scrim layer, if included, is applied to the densified layer precursor continuously and forms part of the continuous ribbon that later is cut into wet panel precursor of pre-selected dimensions. Configuring the manufacturing line to accommodate providing of the scrim layer will vary depending upon the manufacturing line, and is well within the skill of those skilled in the art. For example, the scrim material can be in the form of a continuous roll that is unwound, with the use of powered unwinders preferred. In some embodiments, after the densified layer precursor is applied to the backing sheet, the scrim layer is applied (e.g., rolled) onto the densified layer precursor, with the gypsum slurry for forming the acoustical layer precursor then applied onto the scrim layer.

The continuous ribbon and wet panel precursors, respectively, exhibit sufficient green strength to withstand their own weight as well as the rigors of the manufacturing line, such as vibrations. As used herein, "green strength" refers to strength during or after the setting process, before the ribbon or wet panel precursors are dried. To further facilitate handleability of the ribbon on the manufacturing line, the weight itself per unit volume (density) of the continuous ribbon is minimized. Although the density of the continuous ribbon is not narrowly critical, preferably, the acoustical layer of the continuous ribbon has a maximum density during the process prior to drying of about 53 lb/ft$^3$, more preferably, a maximum density of about 43 lb/ft$^3$. The water to calcined gypsum ratio is adjusted to reduce water content in order to minimize wet weight and drying time. In addition, it is believed that a lower water-stucco ratio enhances formation of open cell voids in the set gypsum-containing acoustical layer when foaming agent, is used. An open cell structure enhances acoustical properties as compared with closed cell voids. Preferably, the weight ratio of water to calcined gypsum in the aqueous slurry preferably ranges from about 0.5:1 to about 1.5:1. Preferably, the calcined gypsum is primarily a beta hemihydrate in which case the water to calcined gypsum ratio is preferably from about 0.7:1 to about 1.5:1, more preferably, from about 0.7:1 to about 1.4:1, even more preferably, from about 0.75:1 to about 1.2:1, and still more preferably from about 0.77:1 to about 1.1:1.

To minimize the water to calcined gypsum ratio, water reducing agent preferably is added to the aqueous gypsum slurry (e.g., via a pump) to enhance the fluidity of the slurry. Any suitable water reducing agent can be used. For example, the water reducing agent can be in the form of any suitable plasticizer commonly used in gypsum wallboard manufacture. Polysulfonates, such as, for example, naphthalene sulfonates or the like, carboxylate compounds (e.g., polycarboxylates) such as acrylates or the like, and melamine compounds are preferred, with carboxylate and melamine compounds even more preferred because they are non-colored materials. For example, Diloflo GW, commercially available from GEO Specialty Chemicals, Inc. is a suitable naphthalene sulfonate, and Ethacryl™ 6-3070, commercially available from Lyondell Chemical Company, is a suitable acrylate.

If present, the water reducing agent is included in the gypsum slurry in any amount sufficient to impart the desired fluidity. For example, the water reducing agent may be included in the aqueous calcined gypsum mixture in an amount up to about 1.5%, more preferably up to about 1.0% by weight of the solids content in the mixture, more preferably, in an amount of from about 0.2% to about 0.5% by weight of the solids content in the mixture. It is to be noted that, in the event that any ingredient is added to the gypsum mixture as part of a solution, the weight amounts provided herein refer to the amount of that particular ingredient, and not the weight amount of the solution in which that particular ingredient is included.

The calcined gypsum can be in the form of alpha calcium sulfate hemihydrate, beta calcium sulfate hemihydrate, water-soluble calcium sulfate anhydrite, or mixtures thereof. In preferred embodiments, the calcined gypsum is in the form of beta calcium sulfate hemihydrate. The calcined gypsum is present in the gypsum slurry in any amount sufficient to allow for the formation of an interlocking matrix of set gypsum. For example, the calcined gypsum can be included in the aqueous calcined gypsum mixture in an amount of from about 50% to about 95% by weight of the solid content in the mixture, preferably, in an amount of from about 60% to about 94% by weight of the solids content in the mixture, more preferably, in an amount of from about 88% to about 94% by weight of the solids content in the mixture, still more preferably, in an amount of from about 90% to about 93.6% by weight of the solids content in the mixture.

In preferred embodiments, cellulosic fiber is added as a fibrous reinforcement into the aqueous gypsum slurry. In particular, the cellulosic fiber provides flexural strength in the dry finished acoustical panel, while also enhancing ductility, stiffness, and green strength in the wet ribbon and wet panel precursor. It is believed that the cellulosic fiber bonds with the set gypsum to enhance the connectivity or networking of the interlocking matrix of set gypsum in order to make the continuous ribbon and/or panel less brittle and thus less susceptible to fracture on the manufacturing line.

The cellulosic fiber can be provided in any amount sufficient to impart the desired fibrous reinforcement. In some embodiments, the cellulosic fiber is present in an amount of from about 1% to about 12% by weight of the solids content in the mixture, more preferably, in an amount of from about 3% to about 6% by weight of the solids content in the mixture.

Any suitable cellulosic fiber can be utilized. Preferably, however, the average length of the cellulosic fiber is less than about 3 mm, more preferably, less than about 2 mm. Such cellulosic fiber lengths are preferred to enhance the cutability of the continuous ribbon and/or the panels. In this respect, longer cellulosic fiber lengths may become frayed upon cutting. For example, recycled newsprint or the like can have desirable fiber lengths for use in the practice of the invention, as compared with old corrugated cardboard (OCC) or kraft paper (although OCC and/or kraft paper can be used in some embodiments, if desired, especially if the fiber lengths thereof are modified to fall within the preferred ranges). As will be appreciated by one of ordinary skill in the art, some commercially available paper fibers, such as, for example, Kayocel 1650 paper fiber available from American Fillers and Abrasives, are provided in a mixture with calcium carbonate in a 1:1 ratio. The presence of the calcium carbonate in such commercially available paper fiber products is advantageous because it prevents clumping of the paper fiber during processing.

Acoustical panel preferably is formulated so that it has desirable cutability characteristics. In this respect, preferably, dry acoustical panel can be cut so that the ends of the cut panels have a smooth, even, aesthetically pleasing edge. Preferably, acoustical panel according to the invention also can be readily scored and snapped. In this respect, by scoring the backing sheet (and facing sheet, if present), e.g., with a knife, the entire panel will snap smoothly, thereby allowing a user to further cut the panel with relative ease at a job site to configure the panel to a desired size and shape. It is noteworthy that the ability of acoustical panels according to the invention to readily score and snap is a significant advantage over conventional acoustical panel, which require the panels to be cut all the way through. Most preferred acoustical panel according to the invention also accommodate a smooth, even cut (e.g., with a utility knife to form a "shadow-line" edge for aesthetic purposes) at a job site just prior to installation.

In preferred embodiments, lightweight aggregate is added to the aqueous gypsum slurry that forms the acoustical layer precursor. Lightweight aggregate desirably has a bulk density of about 10 lb/ft$^3$ or less. Lightweight aggregate provides filler space to reduce the density and weight of acoustical panel of the invention. Examples of suitable lightweight aggregate include, but are not limited to, expanded polystyrene (e.g., chopped expanded polystyrene), expanded vermiculite, expanded perlite, ceramic microspheres, resin microspheres, and the like, or combinations thereof. Notably, lightweight aggregate with a relatively higher water demand (e.g., hydrophilic materials) are less desirable because more water is required to be present in the aqueous gypsum slurry to accommodate them. The amount of water beyond what is needed for the stoichiometry of the hydration reaction of the calcined gypsum is preferably minimized, in accordance with preferred embodiments of the present invention, because the presence of water undesirably increases the wet weight of the continuous ribbon and/or wet panel precursor. As a result, preferred lightweight aggregate according to the invention should absorb as little water as possible. Accordingly, hydrophobic lightweight aggregate, such as, for example, expanded polystyrene (e.g., chopped expanded polystyrene) or the like is most preferred.

As will be appreciated by one of ordinary skill in the art, conventional polystyrene resin beads (e.g., having a bulk density of about 40 lb/ft$^3$) can be expanded with steam to form expanded polystyrene spheres. In this respect, the polystyrene resin beads can be heated and extruded into any of a variety of shapes, and further processed, for example, by cycles of steam expansions followed by cooling/curing. Typically, 3 to 4 series of expansions through a steam expander are used to produce a lightweight material with a cellular internal structure and a preferred density of from about 0.2 lb/ft$^3$ to about 0.4 lb/ft$^3$. The expanded spheres can be in any of a variety of shapes, such as, for example, spherical shape, half sphere, E shape, check-mark shape, S shape, sometimes referred to as a "peanut-shape," as commonly used in packaging applications, and the like. The expanded polystyrene can be passed through a chopper or grinder, and the outflow constrained by variously configured screens, to produce the preferred chopped expanded polystyrene particle size distribution. Although the chopped expanded polystyrene may have any suitable bulk density in accordance with the present invention, preferably it has a bulk density of from about 0.1 lb/ft$^3$ to about 10 lb/ft$^3$, more preferably, from about 0.2 lb/ft$^3$ to about 0.3 lb/ft$^3$. In some embodiments, at least about 90% of the chopped expanded polystyrene particles will pass through a 5 mm mesh.

Lightweight aggregate can be provided in any amount sufficient to provide the desired amount of filler space, reduction in density, and weight of acoustical panel. For example, lightweight aggregate can be present in an amount of from about 0.2% to about 35% by weight of the solids content in the mixture. As will be appreciated by one of ordinary skill in the art, when higher amounts of lightweight aggregate are included in the gypsum mixture, as with lightweight aggregate having relatively higher density, such as perlite, the amount of calcined gypsum can be relatively lower within the preferred calcined gypsum amounts set forth herein. In preferred embodiments comprising chopped expanded polystyrene having a bulk density of from about 0.2 lb/ft$^3$ to about 0.3 lb/ft$^3$, the lightweight aggregate is provided in an amount of from about 0.2% by weight of the solids content in the mixture to about 3% by weight of the solids content in the mixture, more preferably, in an amount of from about 0.7% to about 3% by weight of the solids content in the mixture.

Binder is also included in preferred embodiments of the aqueous gypsum slurry to enhance the strength and integrity of the interlocking set gypsum matrix in dry acoustical panel, and to promote adhesion of the interlocking matrix of set gypsum and the backing sheet. Any suitable binder or combination of binders may be used. Preferably, binders are selected so that some binder functions at the interface between paper and the interlocking matrix of set gypsum, and some binder functions within the interlocking matrix of set gypsum. By way of example, the binder may be in the form of a starch such as, for example, an unmodified corn or wheat starch, latex such as, for example, polyvinyl acetate, acrylic, and styrene butadiene latexes, or combinations thereof. A preferred binder according to the present invention is an acrylic binder, such as, for example, a self cross-linking acrylic emulsion. An example of a self cross-linking acrylic emulsion is RHOPLEX® HA-16, commercially available from Rohm and Haas. Where acrylic binder is included, it preferably is included in an amount of from about 0.5% to about 3% by weight of the solids content in the mixture, more preferably about 1% by weight of the solids content in the mixture.

A starch binder can be included in the gypsum slurry used to form the acoustical layer precursor or the densified layer precursor. Migrating and non-migrating starches are known to those skilled in the art of gypsum wallboard manufacture. Migrating starches can be included in the slurry used to form the acoustical layer precursor and densified layer precursor used to make acoustical panel of the invention where the acoustical panel includes paper on both faces of the acoustical layer precursor or on both faces of the densified layer precursor. As either or both precursor layer is cured, the migrating starch will have a tendency to migrate toward the interface of paper and gypsum, and as the gypsum sets, the binder will improve adherence of the paper to the set gypsum. Migrating starches do not necessarily improve attachment of the paper to set gypsum when paper is on only one surface of the gypsum because the migrating starch tends to migrate away from the paper in that instance. Non-migrating starches can be included in the slurry to enhance the strength of the acoustical layer and densified layer if present, and also can be applied in a solution directly onto paper to enhance bonding to gypsum.

For example, if present, starch can be provided in an amount of from about 0.8% to about 1.5% by weight of the solids content in the mixture. Examples of readily available pregelatinized non-migrating starches that serve the purposes of the present invention are (identified by their commercial names): GemGel starch, commercially available from Manildra Group USA; and PCF1000 starch, available from Lauhoff Grain Co. Examples of readily available non-pregelatinized, non-acid thinned, non-migrating starches that serve the purposes of the present invention are (identified by their commercial names): Minstar 2000, available from Minnesota Corn Products Company; and Clinton 106 Corn Starch, available from ADM Company. Examples of readily available migrating starches that serve the purposes of the present invention are (identified by their commercial names): Hi-Bond starch, commercially available from Lauhoff Grain Co. and LC-211 starch, commercially available from ADM Company.

When binder is used in a preferred practice of the invention, the binder preferably is included in the aqueous calcined gypsum slurry in a cumulative amount of from about 0.5% to about 5% by weight of the solids content in the mixture, more preferably, in an amount of from about 0.5% to about 2% by weight of the solids content in the mixture, still more preferably, in an amount of from about 0.5% to about 1.5%.

In accordance with the present invention, one or more foaming agents are preferably provided in order to impart voids in the set gypsum-containing product to enhance the acoustical properties and provide lighter weight. Any of the conventional foaming agents known to be useful in preparing foamed set gypsum products can be employed. Many such foaming agents are well known and readily available commercially, e.g., from GEO Specialty Chemicals in Ambler, Pa. For further descriptions of useful foaming agents, see, for example, U.S. Pat. Nos. 4,676,835; 5,158,612; 5,240,639 and 5,643,510 and PCT International Application Publication WO 95/16515, published Jun. 22, 1995.

Preferably, the foam is selected so that it forms a stable foam cell in the acoustical layer of the acoustical panel. In this respect, it is believed that acoustical properties are enhanced as the surface area of foam voids in the final product increases and where the voids interconnect so as to form an open cell. By way of illustration, the foam voids can have an average diameter of less than about 200 μm, less than about 100 μm, or even less than about 75 μm. The population of foam voids in the acoustical layer is preferably such that a preponderance of foam voids has a diameter at or near the average diameter. The average diameter of foam voids and the population of foam voids can be evaluated by scanning electron microscopy (SEM) at a magnification of about 100×. Preferably, the acoustical layer has a foam void volume of from about 35% to about 60%, more preferably from about 40% to about 55%, still more preferably from about 45% to about 50%.

It is preferred to use a stable foaming agent such as an alkyl ether sulfate, sodium laureth sulfate such as STEOL®CS-230, commercially available from Stepan. STEOL®CS-230 is a sodium laureth sulfate derived from fatty alcohols, ethoxylated to an average of two moles, and sulfated via a continuous SO₃ process. Where an alkyl ether sulfate is chosen, preferably it is characterized by an average of at least 2-4 ether units between alkyl and sulfate units.

An example of one type of foaming agent, useful to generate stable foams, has the formula

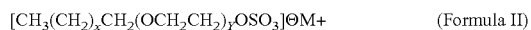  (Formula II)

wherein X is a number from 2 to 20, Y is a number from 0 to 10 and is greater than 0 in at least 50 weight percent of the foaming agent, and M is a cation.

The foaming agent is provided in an amount sufficient to achieve the desired acoustical characteristics in the panel. For example, the foaming agent can be present in an amount of from about 0.003% to about 0.4% by weight of the solids content in the mixture, more preferably, in an amount of from about 0.005% to about 0.03% by weight of the solids content in the mixture, still more preferably from about 0.009% to about 0.015% (e.g., 0.014%) by weight of the solids content in the mixture.

Although not required, if desired, in some embodiments, foam stabilizer may be added to the aqueous calcined gypsum slurry. An example of a suitable foam stabilizer such as an amido amine type of amine oxide (such as lauramidoproplyamine/Myristamidopropylamine Oxide, commercially available from Stepan as AMMONYX®LMDO) and/or cocamide DEA, such as NINOL®40-CO, commercially available from Stepan. If included, the foam stabilizer can be present in any suitable amount normally found when it is included during the manufacture of gypsum wallboard. In one embodiment, foam and foam stabilizer is included in a weight ratio of 80:10:10 of STEOL®CS-230:AMMONYX®LMDO:NINOL®40-CO.

Preferably, an accelerator for accelerating the hydration of calcined gypsum to calcium sulfate dihydrate is included in the aqueous gypsum slurry. Any suitable accelerator may be used in the practice of the invention, as are generally known in the manufacture of gypsum wallboard. By way of example, finely ground (e.g., less than about 25 μm) calcium sulfate dihydrate (i.e., "gypsum seeds"), which are known to enhance nucleation of set gypsum crystals so as to increase the crystallization rate thereof, can be used. As will be appreciated by one of ordinary skill in the art, to promote heat resistance, the gypsum seeds may be coated with a known coating agent such as a sugar (e.g., sucrose, dextrose, or the like), starch, boric acid, long chained fatty carboxylic acid, including salts thereof, or combinations thereof. Other known accelerators include, but are not limited to, sulfate salts such as aluminum sulfate, potassium sulfate, sodium hydrogen sulfate, and combinations thereof, and acids such as sulfuric acid.

The accelerator can be provided in any suitable amount. For example, the accelerator can be present in an amount of from about 1% to about 15% by weight of the solids content in the mixture, more preferably, in an amount of from about 2% to about 8% by weight of the solids content in the mixture, still more preferably, in an amount of from about 3% to about 5% by weight of the solids content in the mixture.

Preferably, one or more enhancing materials are included in the aqueous calcined gypsum mixture, in order to promote strength and/or dimensional stability (e.g., by minimizing shrinkage due to drying stresses) during preparation of the inventive acoustical panels. Desirably, the enhancing materials are selected so that they do not retard the rate of, or otherwise adversely affect, the formation of the set gypsum. By way of example, the enhancing material can be selected from a trimetaphosphate compound, an ammonium polyphosphate having 500-3000 repeating phosphate units, and a tetrametaphosphate compound, including salts or anionic portions of any of the foregoing. Notably, a hexametaphosphate compound (e.g., sodium hexametaphosphate) having 6-27 repeating phosphate units may be used to enhance sag resistance, if desired, although they are not as a beneficial because they have been found to reduce strength and have retardive effects on the rate of hydration of the calcined gypsum. One or more of each type of enhancing material can be used in the practice of the invention, if desired. See, e.g., commonly assigned U.S. application Ser. Nos. 09/249,814, filed on Feb. 16, 1999 and 10/015,066 filed on Dec. 11, 2001.

The use of a trimetaphosphate compound (e.g., salt or anionic portion thereof) is particularly preferred. Inclusion of the trimetaphosphate compound during the hydration of calcined gypsum to form set gypsum results in enhanced strength, including resistance to mechanical deformation (e.g., sag), of the set gypsum. The trimetaphosphate compound can be, for example, in the form of a salt, e.g., sodium trimetaphosphate, aluminum trimetaphosphate, potassium trimetaphosphate, ammonium trimetaphosphate, lithium trimetaphosphate, or the like. Combinations of these salts can also be used. In some embodiments, the trimetaphosphate compound is sodium trimetaphosphate.

The enhancing material can be added to the aqueous slurry in any suitable amount, such as, for example, an amount of from about 0.004% to about 2% by weight of the solids content in the mixture, more preferably, in an amount of from about 0.1% to about 0.3% by weight of the solids content in the mixture.

In some embodiments, a dry mix comprising calcined gypsum, cellulosic fiber, lightweight aggregate, accelerator, and binder is formed. The dry mix is metered into the main mixing chamber, where it is mixed with the water. The foaming agent preferably is added as pregenerated, although in some embodiments, the foam may be generated in situ, if desired. As will be readily apparent to one of ordinary skill in the art, foam may be pregenerated by mixing foaming agent, air, and water in a high shear foam mixing apparatus such that the pregenerated foam is then delivered to the mixer. The foaming agent, water reducing agent, enhancing material, and foam stabilizer preferably are added in fluid form to the mixer or into the discharge of the mixer, for example, as described in U.S. Pat. No. 5,683,635. For example, they can be delivered (e.g., via a pump) separately, together in various combinations, or by entry into the water line that feeds the mixer.

Turning now to the properties of acoustical panel of the invention, acoustical panel have an inherently acoustically absorptive, porous, acoustical layer structure, that is, without the need for holes to be added mechanically. The acoustical panel according to preferred embodiments of the invention results in desirable acoustical properties such that a desirable Noise Reduction Coefficient can be achieved according to ASTM C 423-02, where sound absorption is measured in a reverberation room by measuring decay rate. A desirable Normal Incident Sound Absorption also can be achieved in accordance with a modified ASTM E1050-98, in which the Normal Incident Sound Absorption is measured in an impedance tube from the average of four frequencies, i.e., 250, 500, 1000 and 1600 Hz. The ASTM E 1050-98 is "modified" because the fourth frequency is 1600 Hz, not 2000 Hz. The sample is tested without a backing air space, i.e., with the acoustical panel resting on a flat metal surface, on a Brüel & Klaer Pulse™ Material testing system consisting of Pulse™ Material testing Program Type 7758, Two-microphone Impedance Measurement Tube Type 4206 (400 mm diameter), Power Amplifier Type 2706 and Pulse™, the Multi-analyzer System Type 3560. Preferably, acoustical panels according to the invention exhibit a Normal Incident Sound Absorption of at least about 0.32, pursuant to the modified ASTM E 1050-98. More preferably, acoustical panels according to the invention exhibit a Normal Incident Sound Absorption at least about 0.35, still more preferably, at least about 0.39, even more preferably, at least about 0.42, still more preferably, at least about 0.45, and even more preferably, at least about 0.49. The Normal Incident Sound Absorption described herein is for acoustical panel consisting of an acoustical layer itself, and it is for acoustical panel comprising an acoustical layer and other components, such as a backing sheet, densified layer, scrim layer, and combinations thereof.

Preferably, the acoustical panel exhibits a Noise Reduction Coefficient of at least about 0.5, according to ASTM C 423-02, and more preferably, a Noise Reduction Coefficient at or near 1.0. For example, in some embodiments, the inventive panel demonstrates a Noise Reduction Coefficient according to ASTM C 423-02 of at least about 0.55, even more preferably a Noise Reduction Coefficient of at least about 0.6, still more preferably, a Noise Reduction Coefficient of at least about 0.7, even more preferably, a Noise Reduction Coefficient of at least about 0.8, and still more preferably, a Noise Reduction Coefficient of at least about 0.9. The Noise Reduction Coefficient described herein is for acoustical panel consisting of an acoustical layer itself, and it is for acoustical panel comprising an acoustical layer and other components, such as a backing sheet, densified layer, scrim layer, and combinations thereof.

In preferred embodiments, acoustical panels according to the invention exhibit a flexural strength pursuant to a modified ASTM C367-99 of at least about 100 psi, more preferably, at least about 120 psi. In this respect, ASTM C 367-99 was modified such that the sample was 3 inches wide by 10 inches long and using an 8 inch span. Preferably, acoustical panels according to the invention exhibit a surface hardness pursuant to ASTM C 367-99 of at least about 100 lbs, more preferably, at least about 200 lbs; and a surface burning rating of Class A, according to ASTM E 84-01.

All references, including publications, patent applications, and patents, cited herein are hereby incorporated by reference to the same extent as if each reference were individually and specifically indicated to be incorporated by reference and were set forth in its entirety herein.

While this invention has been described with an emphasis upon preferred embodiments, it will be apparent to those of ordinary skill in the art that variations of the preferred embodiments may be used and that it is intended that the invention may be practiced otherwise than as specifically described herein. Accordingly, this invention includes all modifications encompassed within the scope of the invention as defined by the following claims.

What is claimed is:

1. An acoustical panel comprising:
acoustical layer comprising an interlocking matrix of set gypsum and an additive selected from the group consisting of cellulosic fiber and lightweight aggregate, and combinations thereof, wherein the panel has a Normal Incident Sound Absorption of at least about 0.32, according to a modified ASTM E 1050-98.

2. The acoustical panel of claim 1, wherein the cellulosic fiber is paper fiber.

3. The panel of claim 1, wherein the cellulosic fiber is present in an amount of from about 1% to about 12% by weight of the acoustical layer.

4. The panel of claim 1, wherein the lightweight aggregate is expanded polystyrene.

5. The acoustical panel of claim 4, wherein the expanded polystyrene is a chopped expanded polystyrene.

6. The panel of claim 1, wherein the lightweight aggregate is present in an amount of from about 0.2% to about 35% by weight of the acoustical layer.

7. The panel of claim 1, wherein the panel has a surface hardness of at least about 100 psi, according to ASTM C367-99.

8. The panel of claim 1, wherein the panel has a Class A flame spread according to ASTM E 84-01.

9. The panel of claim 1, wherein the panel has a flexural strength of at least about 100 psi, according to ASTM C367-99.

10. The panel of claim 1, wherein the cellulosic fibers have an average fiber length of less than about 2 mm.

11. The panel of claim 1, wherein the panel has voids therein, wherein the voids in the panel have an average maximum diameter of about 2 mm or less.

12. The panel of claim 1, wherein the panel has a density of from about 14 lb/ft$^3$ to about 24 lb/ft$^3$.

13. The panel of claim 11, wherein the panel is substantially free of mineral wool.

14. The panel of claim 1, wherein the acoustical layer further comprises an enhancing material selected from the group consisting of an ammonium polyphosphate having 500-3000 repeating phosphate units, a trimetaphosphate compound, a tetrametaphosphate compound, a hexametaphosphate compound, and combinations thereof.

15. The panel of claim 1, wherein the acoustical layer further comprises binder.

16. The panel of claim 1, further comprising a backing sheet for supporting the acoustical layer.

17. The panel of claim 16, wherein the backing sheet is selected from the group consisting of non-woven glass face, metallic foil, paper, a laminate comprising paper and a metallic foil, and combinations thereof.

18. The panel of claim 16, wherein the acoustical layer is disposed directly on the backing sheet.

19. The panel of claim 16, further comprising a densified layer, wherein the densified layer is disposed between the backing sheet and the acoustical layer, wherein the densified layer comprises an interlocking matrix of set gypsum, and wherein the densified layer has a density of at least about 30 lbs/ft$^3$.

20. The panel of claim 19, further comprising a face sheet disposed on the acoustical layer.

21. The panel of claim 19, further comprising a scrim layer disposed between the densified layer and the acoustical layer.

22. The panel of claim 21, wherein the scrim layer is selected from the group consisting of paper, non-woven fiberglass, woven fiberglass, synthetic fiber, and combinations thereof.

23. An acoustical panel comprising:
acoustical layer comprising (a) an interlocking matrix of set gypsum, and (b) an enhancing material selected from the group consisting of an ammonium polyphosphate having 500-3000 repeating phosphate units, a trimetaphosphate compound, a tetrametaphosphate compound, a hexametaphosphate compound, and combinations thereof, wherein the panel has voids therein, and wherein the panel has a Noise Reduction Coefficient of at least about 0.5, according to ASTM C 423-02.

24. The panel of claim 23, further comprising a backing sheet for supporting the acoustical layer.

25. The panel of claim 24, wherein the backing sheet is selected from the group consisting of non-woven glass face, metallic foil, paper, a laminate comprising paper and a metallic foil, and combinations thereof.

26. The panel of claim 24, wherein the acoustical layer is disposed directly on the backing sheet.

27. The panel of claim 24, further comprising a densified layer, wherein the densified layer is disposed between the backing sheet and the acoustical layer, wherein the densified layer comprises an interlocking matrix of set gypsum, and wherein the densified layer has a density of at least about 30 lbs/ft$^3$.

28. The panel of claim 27, further comprising a face sheet disposed on the acoustical layer.

29. The panel of claim 26, further comprising a scrim layer disposed between the densified layer and the acoustical layer.

30. The panel of claim 29, wherein the scrim layer is selected from the group consisting of paper, non-woven fiberglass, woven fiberglass, synthetic fiber, and combinations thereof.

31. An acoustical panel comprising (a) acoustical layer comprising (i) an interlocking matrix of set gypsum (ii) cellulosic fiber, and (iii) lightweight aggregate, and optionally one or more of the following ingredients: (iv) binder, (v) foaming agent, (vi) accelerator, (vii) water reducing agent, and (viii) an enhancing material selected from the group consisting of an ammonium polyphosphate having 500-3000 repeating phosphate units, a trimetaphosphate compound, a tetrametaphosphate compound, a hexametaphosphate compound, and combinations thereof; (b) a backing sheet for supporting the acoustical layer; and (c) a densified layer disposed between the backing sheet and the acoustical layer wherein the panel has a Normal Incident Sound Absorption of at least about 0.32, according to a modified ASTM E 1050-98.

32. The panel of claim 31, wherein the backing sheet is formed from a material selected from the group consisting of vinyl, woven or nonwoven cloth, woven or nonwoven fabric, paper, a laminate comprising paper and a metallic foil, and combinations thereof.

33. The panel of claim 31, further comprising a face sheet disposed on the acoustical layer.

34. The panel of claim 31, further comprising a scrim layer disposed between the densified layer and the acoustical layer.

35. The panel of claim 34, wherein the scrim layer is selected from the group consisting of paper, non-woven fiberglass, woven fiberglass, synthetic fiber, and combinations thereof.

36. The panel of claim 31, wherein the acoustical layer comprises:
(a) from about 50% to about 95% of the interlocking matrix of set gypsum;
(b) from about 1% to about 12% of cellulosic fiber;
(c) from about 0.2% to about 35% of lightweight aggregate;
(d) from about 0.5% to about 10% of binder;
(e) from about 0.003% to about 0.4% of foaming agent;
(f) from about 1% to about 15% accelerator;
(g) from about 0.2% to about 1.5% water reducing agent; and
(h) from about 0.004% to about 2% of enhancing material, wherein the foregoing amounts are by weight of the acoustical layer.

37. A panel comprising acoustical layer comprising (a) an interlocking matrix of set gypsum, (b) cellulosic fiber, and (c) lightweight aggregate, and optionally one or more of the following ingredients: (d) binder, (e) foaming agent, (f) accelerator, (g) water reducing agent, and (h) an enhancing material selected from the group consisting of an ammonium polyphosphate having 500-3000 repeating phosphate units, a trimetaphosphate compound, a tetrametaphosphate compound, a hexametaphosphate compound, and combinations thereof, wherein the panel has voids therein, wherein the voids in the panel have an average maximum diameter of about 2 mm or less.

38. The panel of claim 37, further comprising a backing sheet for supporting the acoustical layer.

39. The panel of claim 38, wherein the backing sheet is selected from the group consisting of non-woven glass face, metallic foil, paper, a laminate comprising paper and a metallic foil, and combinations thereof.

40. The panel of claim 38, wherein the acoustical layer is disposed directly on the backing sheet.

41. The panel of claim 37, further comprising a densified layer, wherein the densified layer is disposed between the backing sheet and the acoustical layer.

42. The panel of claim 41, further comprising a face sheet disposed on the acoustical layer.

43. The panel of claim 41, further comprising a scrim layer disposed between the densified layer and the acoustical layer.

44. The panel of claim 43, wherein the scrim layer is selected from the group consisting of paper, non-woven fiberglass, woven fiberglass, synthetic fiber, and combinations thereof.

45. The panel of claim 37, wherein the acoustical layer, prior to curing, comprises:
(a) from about 50% to about 95% of the interlocking matrix of set gypsum;
(b) from about 1% to about 12% cellulosic fiber;
(c) from about 0.2% to about 35% lightweight aggregate;
(d) from about 0.5% to about 10% binder;
(e) from about 0.003% to about 0.4% foaming agent;
(f) from about 1% to about 15% accelerator;
(g) from about 0.2% to about 1.5% water reducing agent; and
(h) from about 0.004% to about 2% enhancing material, wherein the foregoing amounts are by weight of the acoustical layer.

* * * * *